UNITED STATES PATENT OFFICE.

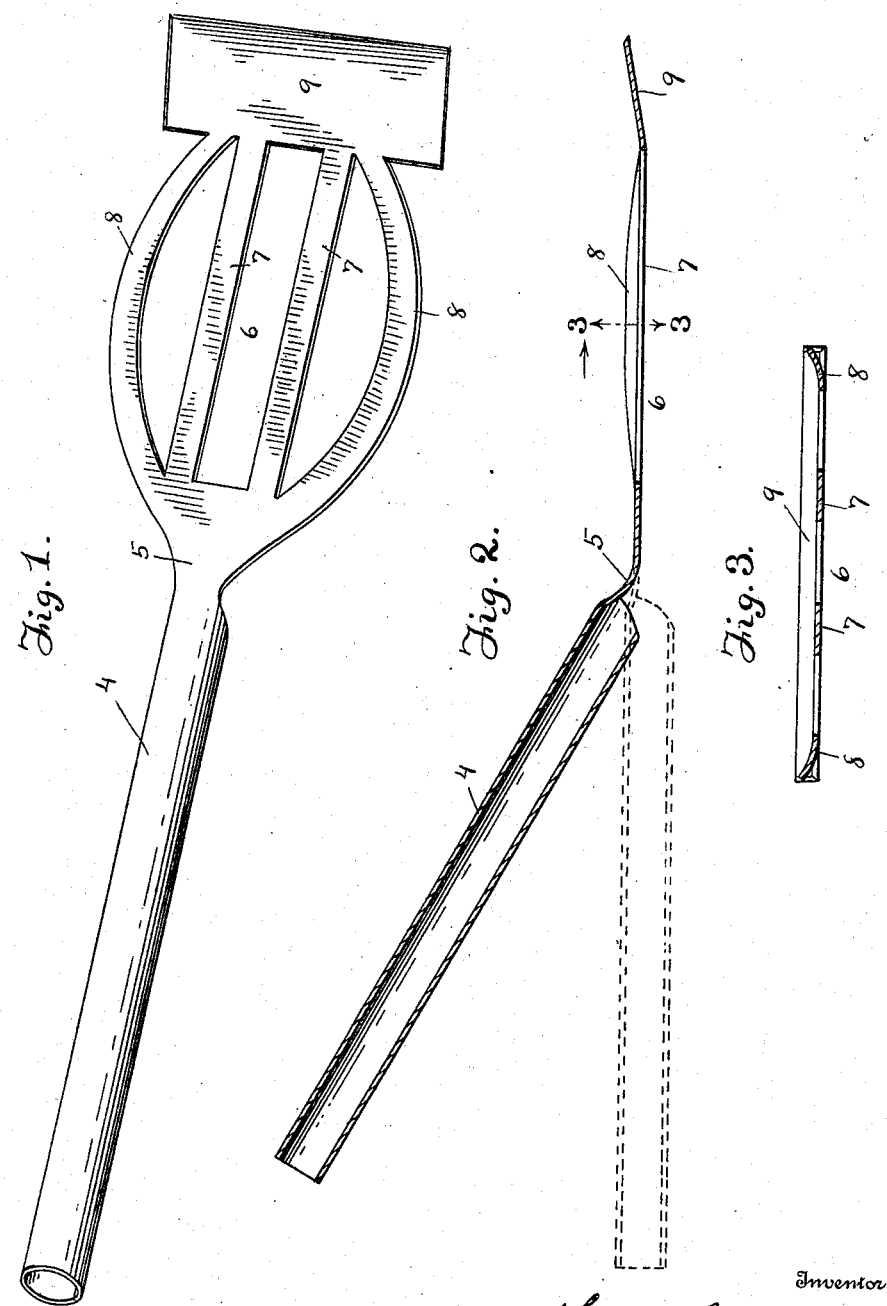

FRANK COTTET, OF CLEVELAND, NEW YORK.

PANCAKE-TURNER.

No. 924,535.

Specification of Letters Patent.

Patented June 8, 1909.

Application filed December 23, 1908. Serial No. 468,898.

*To all whom it may concern:*

Be it known that I, FRANK COTTET, a citizen of the United States, residing at Cleveland, in the county of Oswego and State of New York, have invented certain new and useful Improvements in Pancake-Turners, of which the following is a specification.

This invention relates to means for manipulating pan cakes while the same are being cooked, and the object is to provide an exceedingly inexpensive and novel implement of great utility, which can be successfully employed to cut cakes apart, lift them, and turn them over without splashing the batter.

The preferred embodiment of the invention is illustrated in the accompanying drawings and described in the following specification, but it will be obvious from an inspection of the appended claims that the invention is not necessarily limited to the structure disclosed.

Figure 1 of the drawings is a perspective view of the turner. Fig. 2 is a longitudinal sectional view therethrough. Fig. 3 is a cross sectional view on the line 3—3 of Fig. 2.

In the form of construction illustrated, the implement is an article of manufacture formed from a single piece of sheet metal. It comprises a handle 4 that is tubular in form, and has its ends open in order to permit the circulation of air therethrough. Integrally connected to one end of the handle by a flexible neck 5 is a dished tray 6, the same consisting of a plurality of strips 7 and 8, the outer strips 8 being preferably curved, as shown, and set at an inclination. The outer ends of these strips are integrally connected to a transversely disposed blade 9 that extends beyond the strips 8, and is preferably flat, with its edges sharpened. This blade is set at an inclination to the tray 6, as will be clear by reference to Fig. 2.

It will be obvious that this structure is very simple, and can be cheaply manufactured, inasmuch as it can be stamped of sheet metal and the handle afterward bent to tubular form. In practice, it is preferably made of sheet steel, so that it is durable, and there is nothing liable to excessive wear or breakage. It will be obvious that the device can be readily cleansed. By having a flexible connection between the tray 6 and the handle 4, said handle can be held almost perpendicular to the griddle when the blade is being pushed under a cake, thus avoiding the danger of burning the hand. The square corners of the blade may be employed to separate the cakes upon the griddle and the blade readily run under the cakes in order to detach them from the griddle. It will thus be evident that the cakes will be carried on to the tray, and by having said tray dished with the blade set at an inclination, the uncooked batter upon the surface of the cake is thrown toward the center when the tray is under the cake, thus preventing the splashing of the batter when the cakes are turned.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention what I claim as new, and desire to secure by Letters Patent, is:—

1. As an article of manufacture, a pan cake turner comprising a handle, a dished tray connected at its rear end to the handle, and a blade carried by the front end of the tray and disposed transversely thereof, said blade having its ends projecting beyond the sides of the tray at the juncture of said tray with the blade and having the edges of said projecting ends sharpened.

2. As an article of manufacture, a pan cake turner formed from a single piece of sheet metal and comprising a tubular open ended handle, a transversely dished tray, a flexible neck connection between the rear end of the tray and the front end of the handle that permits the handle being arranged at different inclinations with respect to the tray, and a flat oblong blade carried by the front end of the tray and disposed transversely at an inclination thereto, said blade having its ends projecting beyond the sides of the tray that are adjacent to the juncture of said tray with the blade, said blade having straight front and end edges that are sharpened and produce front and rear sharp-cutting corners at the ends of said blade.

In testimony whereof I affix my signature, in presence of two witnesses.

FRANK COTTET.

Witnesses:
WILLIAM M. GALLAGHER,
MATHEW J. FITZPATRICK.